(12) United States Patent
Cho et al.

(10) Patent No.: US 10,099,119 B2
(45) Date of Patent: Oct. 16, 2018

(54) TOUCH SCREEN INPUTS FOR A VIDEO GAME SYSTEM

(71) Applicant: Nintendo Co., Ltd., Kyoto (JP)

(72) Inventors: Wing S. Cho, Seattle, WA (US); Darren Smith, Bellevue, WA (US)

(73) Assignee: Nintenco Co., Ltd., Kyoto (JP)

( * ) Notice: Subject to any disclaimer, the term of this patent is extended or adjusted under 35 U.S.C. 154(b) by 0 days.

(21) Appl. No.: 15/620,534

(22) Filed: Jun. 12, 2017

(65) Prior Publication Data

US 2017/0340958 A1   Nov. 30, 2017

Related U.S. Application Data

(63) Continuation of application No. 15/285,184, filed on Oct. 4, 2016, now Pat. No. 9,675,876, which is a continuation of application No. 11/507,020, filed on Aug. 21, 2006, now abandoned.

(60) Provisional application No. 60/709,447, filed on Aug. 19, 2005.

(51) Int. Cl.
| | |
|---|---|
| *A63F 13/00* | (2014.01) |
| *A63F 13/2145* | (2014.01) |
| *A63F 13/25* | (2014.01) |
| *A63F 13/42* | (2014.01) |
| *A63F 13/92* | (2014.01) |
| *A63F 13/53* | (2014.01) |
| *A63F 13/426* | (2014.01) |
| *A63F 13/822* | (2014.01) |
| *A63F 13/828* | (2014.01) |

(52) U.S. Cl.
CPC .......... *A63F 13/2145* (2014.09); *A63F 13/25* (2014.09); *A63F 13/42* (2014.09); *A63F 13/426* (2014.09); *A63F 13/53* (2014.09); *A63F 13/92* (2014.09); *A63F 13/822* (2014.09); *A63F 13/828* (2014.09); *A63F 2300/1075* (2013.01); *A63F 2300/6623* (2013.01)

(58) Field of Classification Search
CPC ....... G06F 3/04883; A63F 13/10; A63F 13/42
See application file for complete search history.

(56) References Cited

U.S. PATENT DOCUMENTS

| | | |
|---|---|---|
| 6,005,545 A | 12/1999 | Nishida et al. |
| 6,116,707 A | 9/2000 | Avida |
| 6,280,323 B1 | 8/2001 | Yamazaki et al. |
| 6,699,127 B1 | 3/2004 | Lobb et al. |
| 6,807,562 B1 | 10/2004 | Pennock et al. |
| 6,856,860 B2 | 2/2005 | Stringham et al. |
| 7,445,549 B1 | 11/2008 | Best |
| 9,675,876 B2 | 6/2017 | Cho et al. |
| 2003/0216181 A1 | 11/2003 | Danieli et al. |
| 2004/0006412 A1 | 1/2004 | Doose et al. |

(Continued)

OTHER PUBLICATIONS

Madden 2003, IGN.com, http://ps2.ign.com/articles/367/367202p1.html. Created Aug. 8, 2002.

(Continued)

*Primary Examiner* — Reginald Renwick
(74) *Attorney, Agent, or Firm* — Nixon & Vanderhye, P.C.

(57) ABSTRACT

Example systems and methods involve detecting an input to a touchscreen display of a video game apparatus; determining a video game action based on a shape of the input; and determining a timing of the video game action based on a color associated with the input.

22 Claims, 9 Drawing Sheets

(56) References Cited

U.S. PATENT DOCUMENTS

2006/0073862 A1    4/2006  Shinoda et al.
2006/0253793 A1   11/2006  Zhai et al.

OTHER PUBLICATIONS

Madden 2003 Game Manual.
Gamespot. "Madden NFL 2005 Review." http://www.gamespot.com/ds/sports/maddenfl/review.html. Accessed Apr. 20, 2009. Created Nov. 19, 2004.
Gamespot. "Metal Slug Advance." http://www.gamespot.com/gba/action/metalslugcybermission/review.html. Accessed Apr. 20, 2009. Created Dec. 2, 2004.
Gamespot. "Yoshi Touch and Go Review." http://www.gamespot.com/ds/action/yoshi/review.html. Accessed Apr. 20, 2009. Created Mar. 11, 2005.
Gamespot. "Kirby: Canvas Curse Review." http://www.gamespot.com/ds/action/kirbycanvascurse/review.html. Accessed Apr. 20, 2009. Created Jun. 13, 2005.
Battle Bugs Game Manual.
Mobs Games, "Battle Bugs." http://web.archive.org/web/20050528201750/http://www.mobygames.com/game/dos/battle-bugs. Created May 28, 2005 (indicating that Battle Bugs was made in 1994).

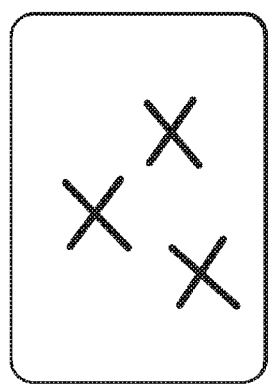
FIG. 8C
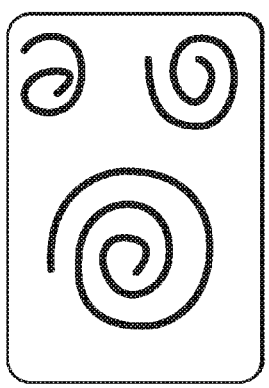
FIG. 8F
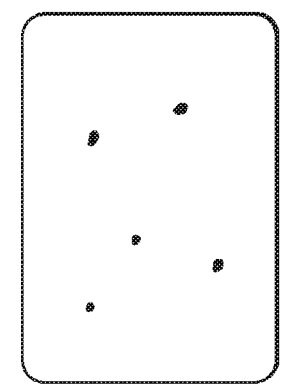
FIG. 8I
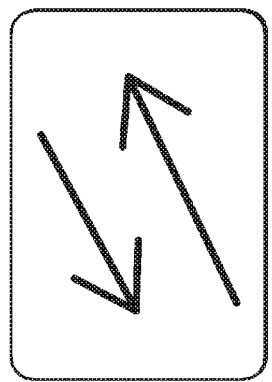
FIG. 8B
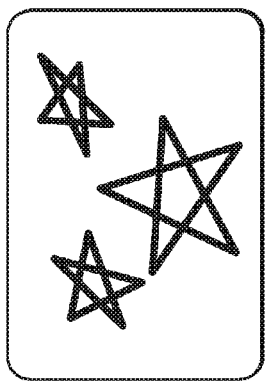
FIG. 8E
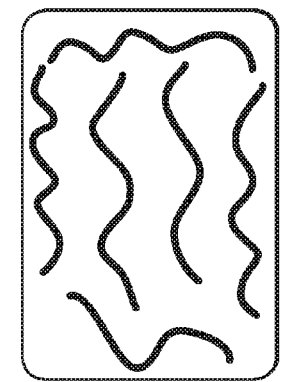
FIG. 8H
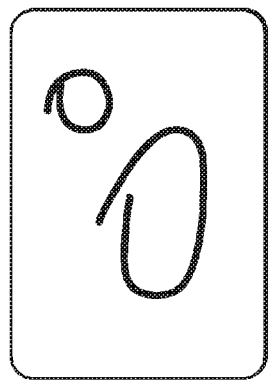
FIG. 8A
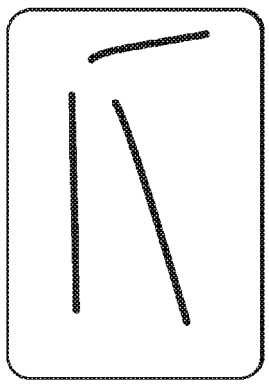
FIG. 8D
FIG. 8G

TOUCH SCREEN INPUTS FOR A VIDEO GAME SYSTEM

CROSS-REFERENCE TO RELATED APPLICATIONS

This application is a continuation of U.S. application Ser. No. 15/285,184, filed Oct. 4, 2016, which is a continuation of U.S. application Ser. No. 11/507,020, filed Aug. 21, 2006, which claims priority of U.S. Provisional Application No. 60/709,447, filed Aug. 19, 2005. The contents of each of these applications are incorporated herein in their entireties.

BACKGROUND AND SUMMARY

This application describes various inputs to a touch screen of a game device that may be used, for example, to control game play.

User inputs to computer systems may be supplied in various ways. For example, when the computer system is a video game system, inputs are typically supplied using cross-switches, joysticks, buttons and the like. A cross-switch or a joystick may be used to control movement of a video game object in various directions and various buttons may be used to control character actions such as jumping, using a weapon and the like.

The systems and methods described herein involve a video game system that has a touch sensitive display screen that can be used to supply inputs used in video game control.

In one example system and method, a user or player draws movement patterns on the touch sensitive display screen. The drawn movement patterns are stored and a game object can be moved in accordance with a movement pattern selected from the memory by the user. This example system and method can be applied by way of example without limitation to a football game in which a user can design and store plays involving various football player movements. These plays can be selected during a game against an opponent.

In another example system and method, a user or player draws a movement pattern on the touch sensitive display screen and a game object is moved based a shape and a color of the drawn movement pattern. This example system and method can be applied by way of example without limitation to moving different game objects using the same movement pattern. For example, a first game object can be moved by drawing a movement pattern of a first color and a second game object can be moved by drawing a movement pattern of a second different color.

In another example system and method, the touch-sensitive display screen can display a map of a game world showing deployment of one or more game objects associated with a video game teammate and of one or more game objects associated with a video game opponent. Tactical game data can be drawn on the map and communicated to another video game system for display on a corresponding map displayed on the other video game system. This example system and method can be applied by way of example without limitation to tactical games so that users or players can plan missions with teammates.

BRIEF DESCRIPTION OF THE DRAWINGS

These and other features and advantages will be better and more completely understood by referring to the following detailed description of exemplary non-limiting illustrative embodiments in conjunction with the drawings of which:

FIGS. 8A-8J show various inputs that may be made to the touchscreen of the portable game system;

DETAILED DESCRIPTION OF EXAMPLE EMBODIMENTS

Figure 1:
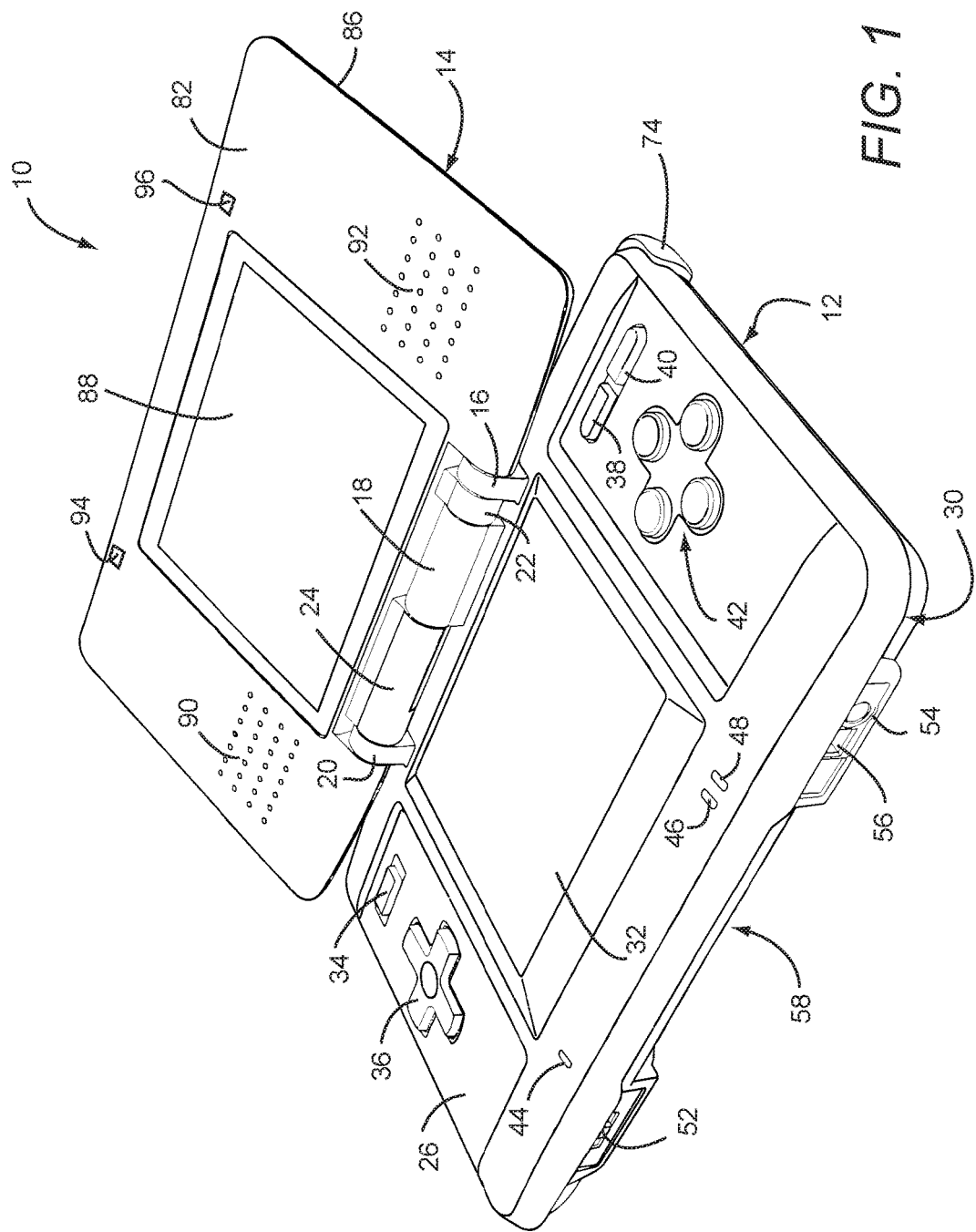
FIG. 1 is a perspective view of an example game system, with the game system shown in an open, ready-to-use orientation.
Figure 2:
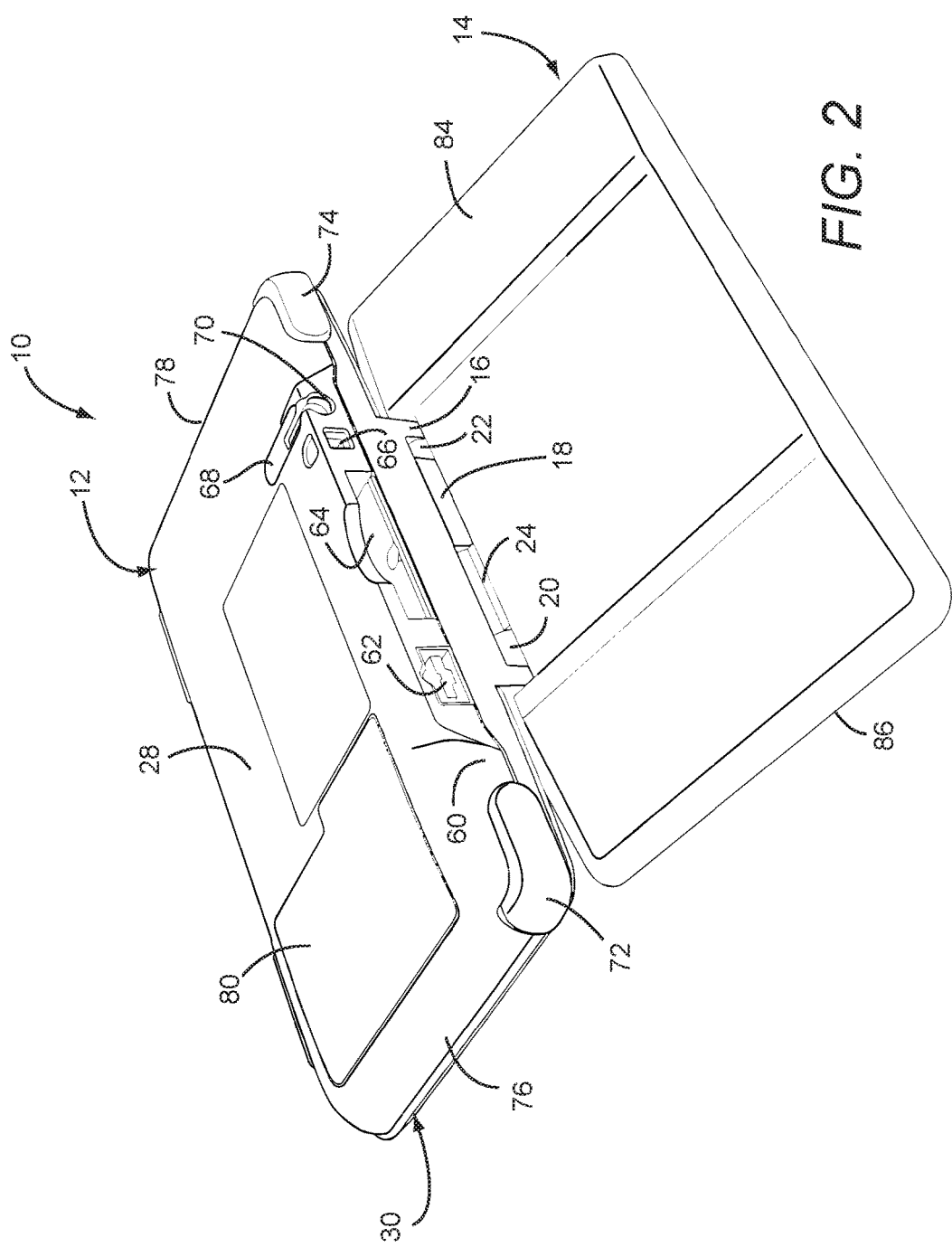
FIG. 2 is a inverted perspective view of the game system shown in FIG. 1.

Referring to FIGS. 1 and 2, in an illustrative embodiment the game system 10 includes a main body 12 and a cover body 14 hingedly connected to each other along an upper edge of the main body 12 and a lower edge of the cover body 14 (references herein to terms such as "upper" and "lower" and "forward" and "rearward" are for ease of understanding and are made relative to an orientation of the game device where the cover body 14 is in an open position and the game is being held by a user in a normal operating position). Hinge elements 16, 18 and 20 on the main body 12 mesh with hinge elements 22 and 24 on the cover body, with a hinge pin (not shown) extending through the aligned hinge elements in conventional fashion. Note that because hinge elements 16, 18 and 20 extend from the upper (or inner) face 26 of the main body 12, the cover body 14 overlies the upper face 26 when the cover body 14 is closed over the main body. When the cover body 14 is in its fully open position, it is substantially parallel to the main body 12 but lies in a substantially parallel, offset plane. The main body 12 also has a lower (or outer) face 28 (FIG. 2) and a peripheral edge 30.

A first display screen 32 is recessed within the upper face 26 of the main body 12 with dimensions of approximately 2 inches in length and 1⅞ inches in width, yielding a diagonal screen dimension of 3 inches. The screen in the exemplary embodiment is a backlit (e.g., 40 candelas), color liquid crystal display (LCD) with a display resolution of 256×192 dots (aspect ratio 4:3). This screen is touch sensitive and may be activated by a stylus, described further herein. A power button 34 is located in the upper left corner of face 26 and is used to turn the game on and off. A cross-shaped directional control button 36 is located adjacent and below the power button 34, and is used for game play control.

More specifically, display screen 32 includes a resistive-membrane touch panel that allows coordinates to be obtained in dot units. The touch panel can be operated with a finger or a stylus.

In the upper right corner of the main body 12, there are side-by-side "start" and "select" buttons 38, 40, respectively, with X/Y/A/B buttons 42 located adjacent and below the "start" and select" buttons. Buttons 38, 40 and 42 are also used for game play control. A microphone 44 (which may be an omni-directional condenser microphone) is located below the left edge of screen 32 for use with specially designed games having a microphone feature. A battery recharge indicator LED 46 and a power indicator LED 48 are also located on the upper face 26, adjacent the lower edge thereof, below the right edge of screen 32.

Figure 3:
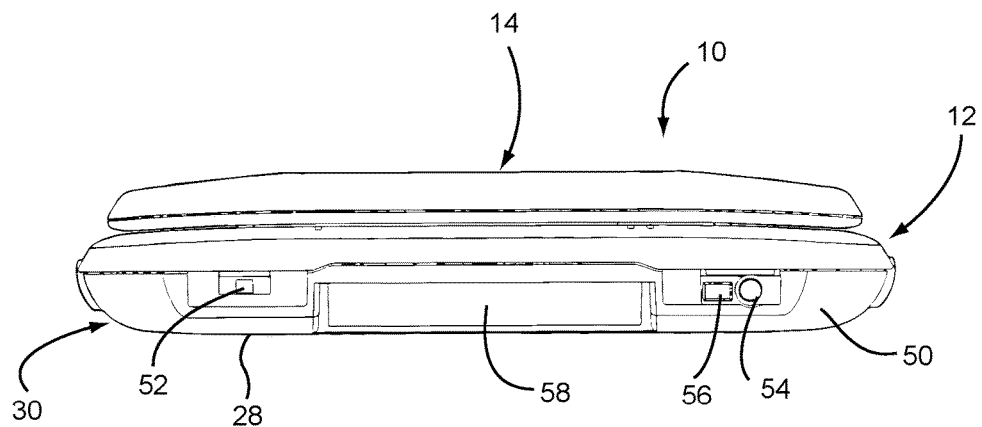
FIG. 3 is a front elevation of the system shown in FIG. 1, but with the game system shown in a closed position.
Figure 4:
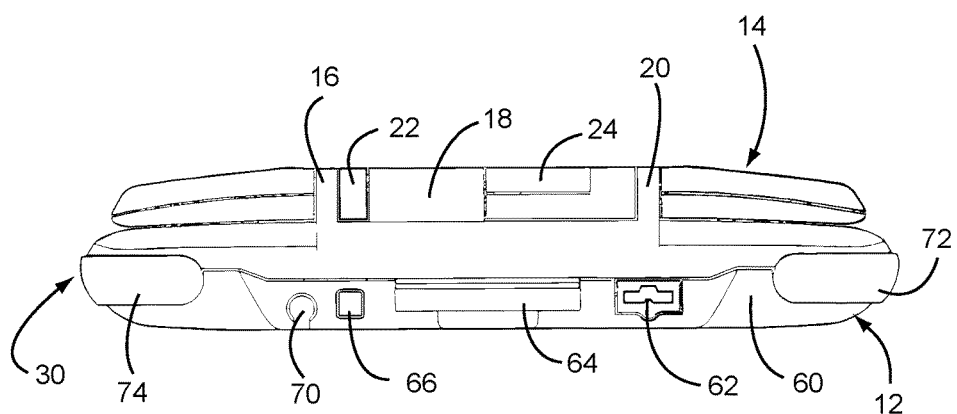
FIG. 4 is a rear elevation of the system shown in FIG. 3.

With reference now especially to FIG. 3, a lower or forward portion 50 of the peripheral edge 30 (closest to the user) is provided with a volume control slide 52 and headphone and microphone connectors 54, 56 on either side of a first game slot 58. Slot 58 is especially designed for larger game cartridges or cards originally designed for use with the assignee's Game Boy Advance® game system.

Figure 5:
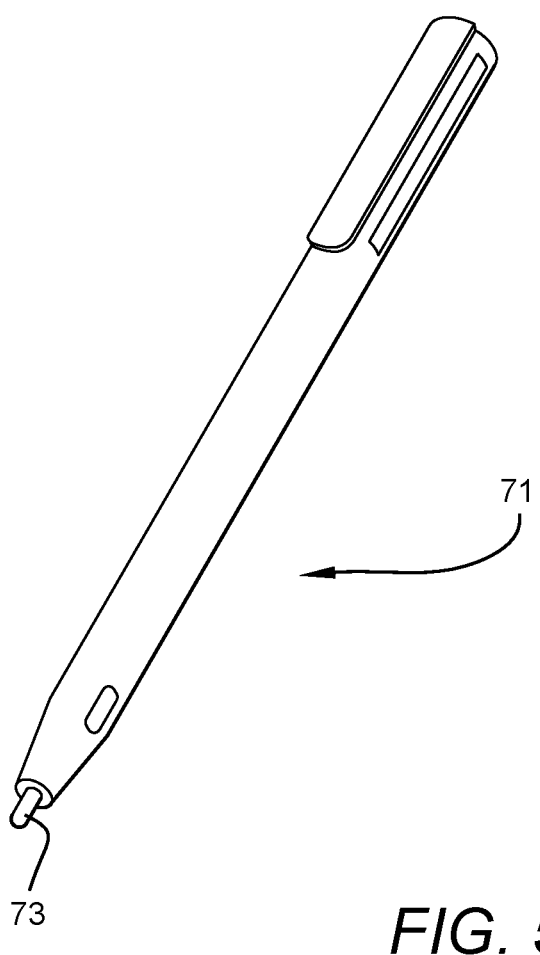
FIG. 5 is a perspective view of a stylus for use with the game system shown in FIGS. 1-4.

As best seen in FIG. 2, an upper or rearward portion 60 of the peripheral edge 30 is provided with an external extension connector 62 that permits connection to an AC adapter for recharging the internal battery (not shown), or for operating the game using household power. A second game slot 64 in edge portion 60 is designed for receiving memory or game cards especially designed for this game device. The second game slot 64 is smaller than the first game slot 58, reflecting the different sizes of the game cards. Openings 66, 68 form an elbow-shaped through slot adapted for securing a wrist strap (not shown), thereby enabling the user to secure the game device to the body and thus minimize the potential for losing or misplacing the game. A stylus port or holder, in the form of a blind bore 70 is located adjacent the wrist-strap mount for holding a stylus 71 (FIG. 5) before or after use.

The stylus 71 is a plastic pencil-shaped device with a rounded tip 73 and is used to activate the touch screen 32.

A pair of left, right control buttons (or shoulder buttons) 72, 74 are located on the peripheral edge 30, at the corners where the upper portion 60 of the peripheral edge 30 meets the side portions 76, 78 of the peripheral edge. The location of these buttons and the location of previously described buttons 34, 36 and 42 facilitate manipulation game control by the user's thumbs and index fingers when the game is held with two hands in a natural and intuitive manner.

The lower (or outer) face 28 of the main body is provided with a battery cover 80 (FIG. 2) for accessing a rechargeable battery pack located within the main body.

The cover body 14 also has an upper (or inner) face 82 (FIG. 1) and a lower (or outer) face 84 (FIG. 2) connected by a peripheral edge 86. The upper face 82 incorporates a second display screen 88 of substantially the same dimensions as screen 32. Screen 88 is also a backlit color LCD. The cover body 14 also incorporates a pair of stereo speakers, with speaker grills 90, 92 located on opposite sides of the screen 88. Dimples or pads 94, 96 may be located above and laterally of screen 88. The dimples may be made of a compressible polymer or other suitable material and serve to dampen engagement of the inner surface 82 of the cover body 14 with the inner surface 26 of the main body 12 when the cover body is closed over the main body.

As already noted, the game card slot 58 is sized and adapted to receive a conventional game card designed for the by now well known Nintendo Gameboy Advance System®. Accordingly, the game card per se for slot 58 does not form any part of this invention and need not be described further.

Figure 6:
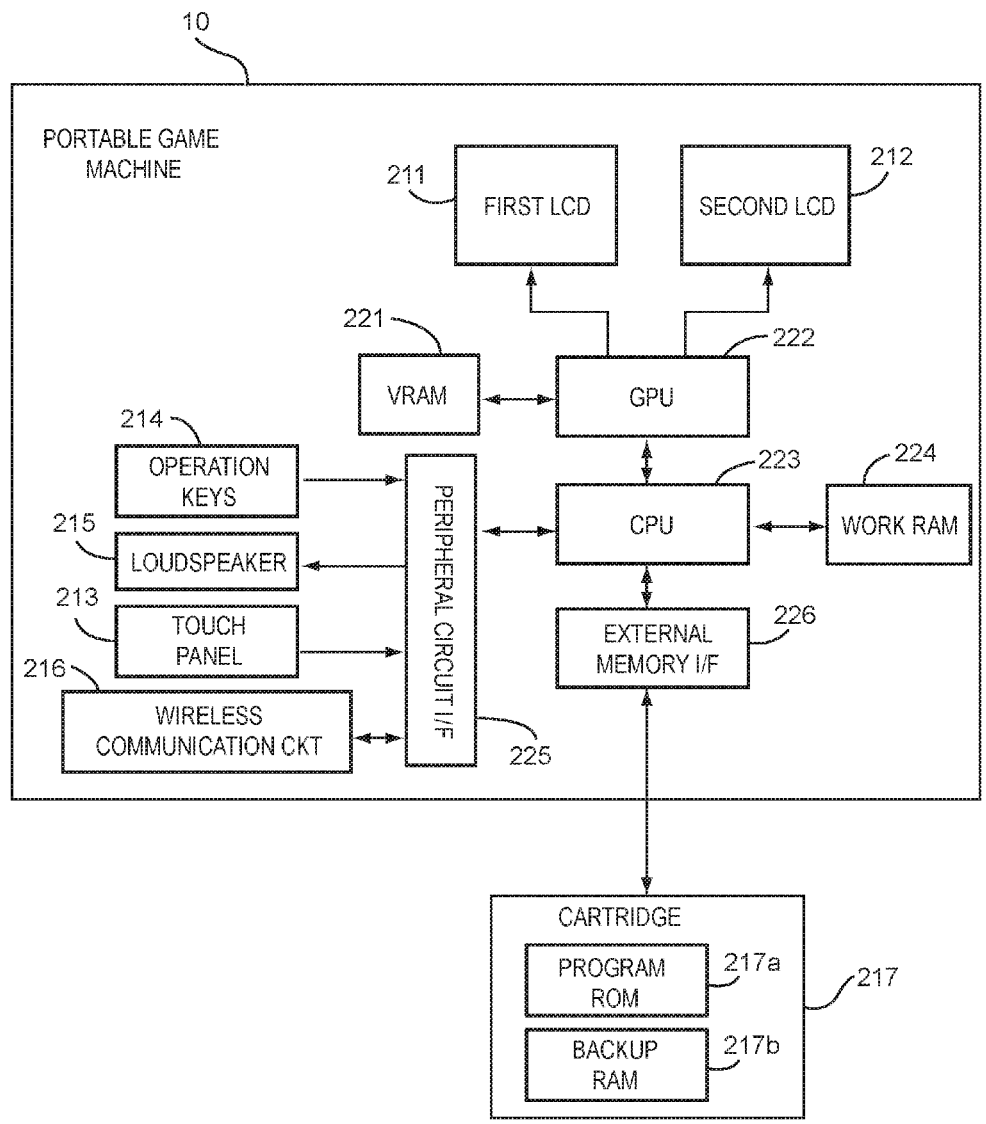
FIG. 6 is an illustration showing an example internal configuration of a portable game system.

FIG. 6 is an illustration showing an example internal configuration of the portable game system 10. As shown in FIG. 6, the portable game system 10 includes a CPU (central processing unit) 223, which is an example of a computer for executing the game program, and other components. The CPU 223 is connected to a work RAM (working storage unit) 224, a GPU (graphic processing unit) 222, and a peripheral circuit I/F (interface) 225. The work RAM 224 is a memory for temporarily storing, for example, the game program to be executed by the CPU 223 and calculation results of the CPU 223. The GPU 222 uses, in response to an instruction from the CPU 223, a VRAM 221 to generate a game image for display output to a first LCD (liquid crystal display unit) 211 and a second LCD 212, and causes the generated game image to be displayed on the first display screen 32 of the first LCD 211 and the second display screen 88 of the second LCD 212. The peripheral circuit I/F 225 is a circuit for transmitting and receiving data between external input/output units, such as the touch panel 213, the operation keys 214, the loudspeaker 215, and the wireless communication circuit 216, and the CPU 223. The touch panel 213 (including a device driver for the touch panel) outputs coordinate data corresponding to a position input (specified) with the stylus 71. The wireless communication circuit 216 may be configured for wireless communication in accordance with any of various known wireless protocols such as Bluetooth; any type of 802.11 (Wi-Fi) protocol; HiperLAN/1 protocol; HiperLAN/2 protocol; HomeRF protocol; etc. Although shown as a single block, wireless communication circuit 216 is intended to encompass arrangements in which two or more different protocols are usable or two or more different circuits (e.g., one for short-range communications such as WiFi and another for long-range communications using, for example, wireless telephone protocols) are provided. Of course, the example portable game system is not limited to wireless communication and may alternatively or additionally include circuitry that provides a wired communication link, e.g., to an internet access point.

To access the internet using the portable game system, wireless communication circuit 216 may, for example, wirelessly connect to an internet access point. Such an access point may be in a public location (e.g., stores, malls, libraries, etc.) or may be in a user's home (e.g., a cable modem).

The CPU 223 is electrically connected to the external memory I/F 226, in which the cartridge 217 is inserted via slot 64. The cartridge 217 is a storage medium for storing the game program and, specifically, includes a program ROM 217a for storing the game program and a backup RAM 217b for rewritably storing backup data. The game program stored in the program ROM 217a of the cartridge 217 is loaded to the work RAM 224 and is then executed by the CPU 223. In the present embodiment, an exemplary case is described in which the game program is supplied from an external storage medium to the portable game system 10. However, the game program may be stored in a non-volatile memory incorporated in advance in the portable game system 10, or may be supplied to the portable game system 10 via a wired or wireless communication circuit.

Figure 7:
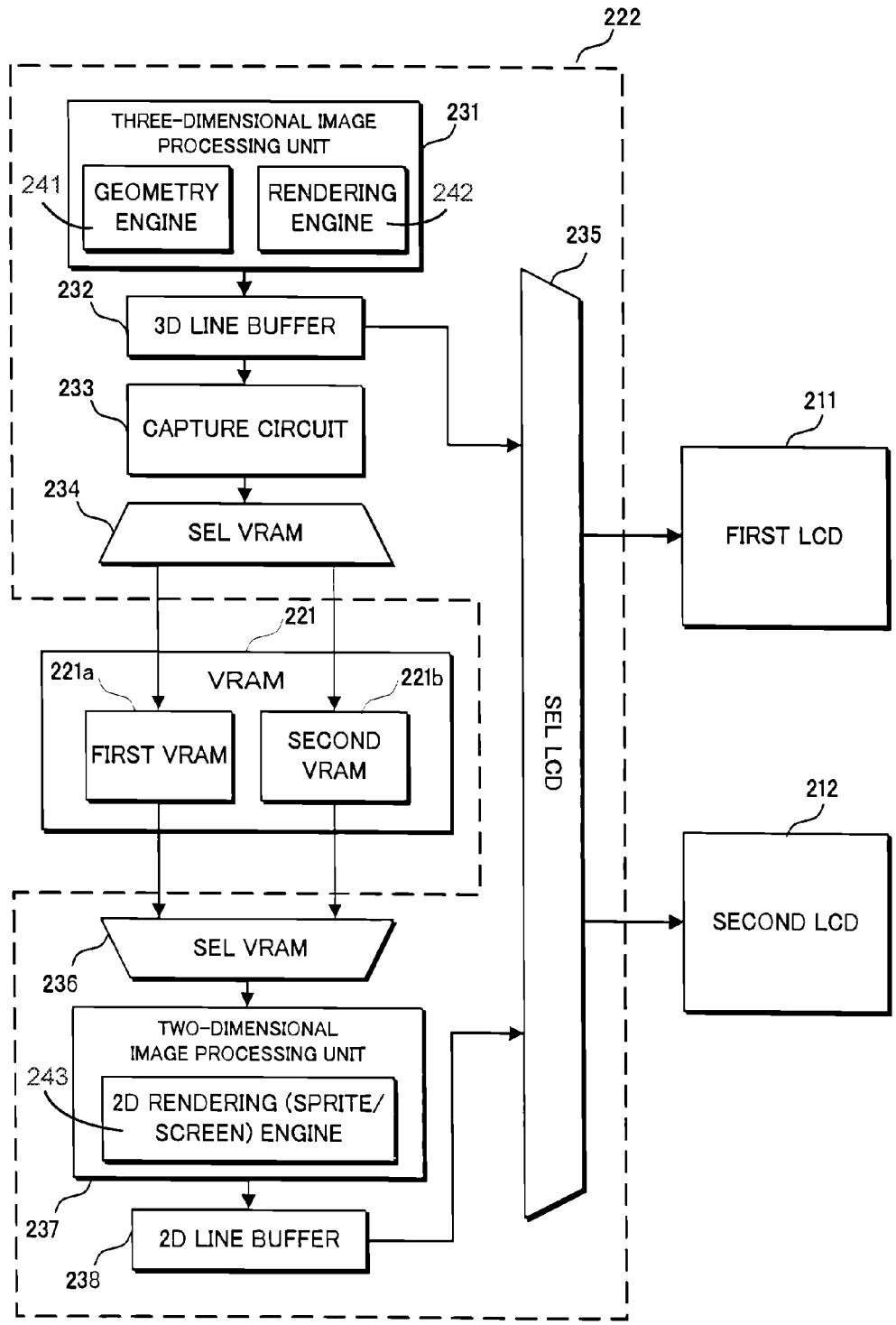
FIG. 7 is an illustration showing an example internal configuration of a GPU 222.

FIG. 7 is a block diagram of an example arrangement of the GPU 222. The GPU 222 includes two image processing units, that is, a three-dimensional image processing unit 231 and a two-dimensional image processing unit 237. The three-dimensional image processing unit 231 includes a geometry engine 241 for calculating each vertex of a three-dimensional model based on three-dimensional model data and a rendering engine 242 for generating a game image from the three-dimensional model disposed on a virtual three-dimensional game space. The two-dimensional image processing unit 237 includes a 2D rendering engine 243 for generating a game image based on two-dimensional image data representing characters and two-dimensional image data representing backgrounds. More specifically, the two-dimensional image processing unit 237 disposes a two-dimensional image representing a character on a virtual screen called a "sprite" and a two-dimensional image representing a background on a virtual screen called a "screen", and then synthesizes these virtual screens to generate a game image to be eventually displayed.

The three-dimensional image processing unit 231 is connected to the 3D line buffer 232. The 3D line buffer 232 is a buffer memory for temporarily retaining image data for one scanning line of the first LCD 211 (or the second LCD 212). The image data generated by the three-dimensional image processing unit 231 is stored in this 3D line buffer 232 sequentially by one line.

The 3D line buffer 232 is connected to a capture circuit 233 and an LCD selector (SEL LCD) 235. The capture circuit 233 sequentially reads image data for one line stored in the 3D line buffer 232 and then sequentially stores the read image data in the VRAM 221, which will be described further below, thereby capturing the game image generated by the three-dimensional image processing unit 231.

The capture circuit 233 is connected to a VRAM selector (SEL VRAM) 234. The VRAM 221 is provided with two VRAMs, that is, a first VRAM 221a and a second VRAM 221b. Instead of these two first and second VRAMs 221a and 221b, a single VRAM may be used with its two different storage areas being used as the first VRAM 221a and the second VRAM 221b. The VRAM selector 234 switches an output destination of the capture circuit 233 between the first VRAM 221a and the second VRAM 221b.

The first VRAM 221a and the second VRAM 221b are connected to a VRAM selector (SEL VRAM) 236. The VRAM selector 236 switches a source of data to the two-dimensional image processing unit 237 between the first VRAM 221a and the second VRAM 221b.

The two-dimensional image processing unit 237 is connected to a 2D line buffer 238. As with the 3D line buffer 232, the 2D line buffer 238 is a buffer memory for temporarily retaining image data for one scanning line of the second LCD 212. The image data generated by the two-dimensional image processing unit 237 is stored in this 2D line buffer 238 sequentially by one line.

The 2D line buffer 238 is connected to an LCD selector 235. The LCD selector 235 switches an output destination of the 3D line buffer 232 between the first LCD 211 and the second LCD 212, and an output destination of the 2D line buffer 238 between the first LCD 211 and the second LCD 212. In the present embodiment, the LCD selector 235 performs control such that, when the output of the 3D line buffer 232 is supplied to the first LCD 11, the output of the 2D line buffer 38 is supplied to the second LCD 212, and when the output of the 3D line buffer 232 is supplied to the second LCD 212, the output of the 2D line buffer 238 is supplied to the first LCD 211.

Additional information regarding portable game system 10 may be found in application Ser. No. 11/111,985 filed Apr. 22, 2005 and Ser. No. 10/921,957, filed Aug. 20, 2004, the contents of which are incorporated herein in their entirety.

Generally speaking, inputs used to control game play have conventionally been provided by a user actuating devices such as a cross-switch, a joystick, various buttons, and the like. The provision of a game system with a touch screen such as display screen 32 permits additional inputs that can be used to enhance the gaming experience. For example, a user or player can draw shapes, symbols and characters onto the touch screen 32. The application currently being executed by the game system e.g., a game) recognizes the input and then interprets the input for controlling the application.

By way of example without limitation, CPU 223 is supplied with coordinate data from touchscreen panel 213 when the stylus 71 (or a user's finger) is used to draw on the touchscreen panel. The coordinate data may be compared with pre-stored shapes, symbols and characters to determine the shape drawn on the touchscreen panel. As noted, the application currently being executed by the game interprets the determined shape, symbol or character for controlling the application.

Figure 8J:
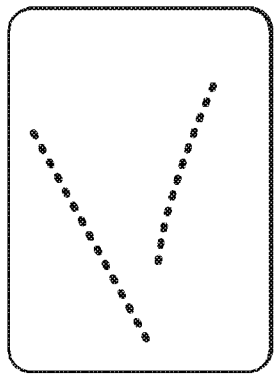

Example shape, symbols and characters and possible instructions for a game include, but are not limited to:
  circles (see FIG. 8A), which can be drawn to "select" and "highlight" objects on the screen;
  arrows (see FIG. 8B), which can be drawn on the screen to tell game objects (e.g., characters) to move in the direction of the arrow;
  X's (see FIG. 8C), which can be drawn to indicate a target to hit or a target destination to go to;
  lines (see FIG. 8D), which can be drawn to create a barrier or border that an object cannot pass; and
  dots (see FIG. 8I), which can be drawn to indicate where to hit (e.g., a game character(s)).

Other more complicated shapes and symbols such as stars (See FIG. 8E), swirls (see FIG. 8F), the infinity symbol (see FIG. 8G), wavy lines (see FIG. 8H), dotted lines (see FIG. 8J), triangles, question marks, hearts, etc. may be drawn and associated with commands for the game program. Such shapes, symbols and characters can generally be drawn without lifting the stylus from the touch screen surface and are sufficiently distinct from each other so that the game can recognize what has been drawn and take appropriate actions in response thereto.

The inputting of such shapes, symbols and characters can be implemented in a wide variety of games. For example, in a football game, users can draw their own plays and have their teams execute those plays. For example, prior to each play, a map of the field may be drawn for all team users to see. One user may move players into formation by drawing their positions on the touchscreen, and drawing their selected movement pattern as well by drawing arrows on the touchscreen from their formation position to their target position. Once the ball is snapped, this information can be displayed for each player on the team—they can see in 3D view the arrow drawn for their target path.

Figure 9B:
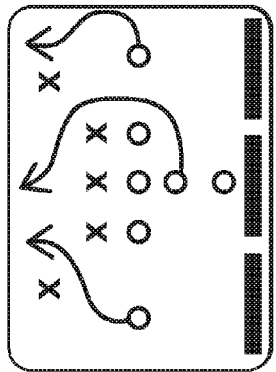
FIGS. 9A and 9B are used in an explanation of touchscreen inputs for a football video game.
Figure 9A:
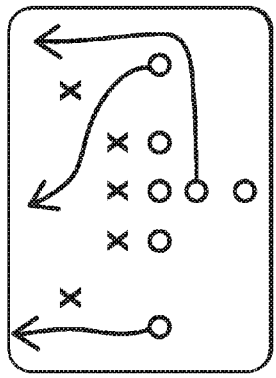

These plays can be created in advance and stored in memory for selection during the game or a new play can be created during the game to take into account a particular game situation. For example, FIGS. 9A and 9B show two plays in which paths with arrows on the end are drawn to move offensive players (indicated by circles). Similar plays may be developed in which defensive players are moved in accordance with paths drawn using the touchscreen. In other implementations, the touchscreen may be used to develop various offensive and defensive formations and paths may be drawn to move the players from these initial formations. When an offensive player chooses to use a particular formation (e.g., by selection of an offensive formation previously specified by that user and stored in memory or by drawing the formation on the touch screen), the game program may be configured to recognize the formation and select for, or suggest to, the defensive player a particular defensive formation from among various defensive formations previously specified by that user and stored in memory.

Obviously, touchscreen inputs like those described above may be used to position and move players in other sports video games including baseball, hockey, soccer, basketball, etc. Additional inputs may be designated in accordance with the type of game. For example, inputs for a baseball game may be used, for example, to designate pitch location and type (e.g., straight line for fast ball, curved line for curve ball, etc.).

The above touchscreen inputs can also be used in tactical and military video games. For example, the touchscreen inputs may be used to specify the movement of the soldier game character in a field of battle. The inputs may also be used to specify the movement of a military vehicle game object (e.g., tank) in a field of battle.

Figure 10C:
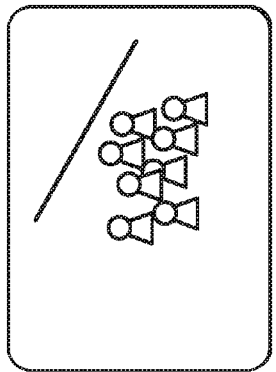
FIGS. 10A-10F are used in an explanation of touchscreen inputs for a tactical video game.
Figure 10F:
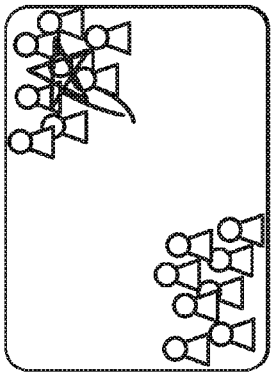

Various tactical games may use the touchscreen to permit users or players to plan out attacks and defenses to complete missions. With reference to FIG. 10A, arrows can be drawn to indicate where soldiers need to go, while circles or X's can be used to indicate checkpoints for the soldiers to stop and await further orders. Users can draw with different colors to indicate movement of different teams. Mission plans can be developed before a mission or plans can be altered or modified in real time during the mission to take into account current game situations. In an example implementation, the main game play would take place on upper display screen 88, while the lower (touchscreen) 32 would show a map that could be altered by drawing inputs.

As mentioned above, movement patterns may be processed in accordance with both the shape and color of the drawn pattern. Different colors may be used to input movement patterns for different game objects. Of course, the systems and methods described herein are not limited to processing only movement patterns in accordance with color. Thus, for example, a first game object may be moved when a movement pattern is drawn using a first color and a second different game object may be moved when the same movement pattern is drawn using a second different color. The processing of other shapes, symbols and characters may also be dependent on the color used to draw these shapes, symbols and characters.

Different colors may also be used to introduce a variable time element with respect to an associated action. For example, drawing a shape, symbol or character in a first color may result in an action associated with the shape, symbol or character being carried out immediately. Drawing the same shape, symbol or character in a second, different color may result in the action being carried out with some delay associated with use of the second color.

Different colors may also be used to input shapes, symbols and characters associated with alternate game actions. For example, a user may input a shape, symbol or character using a first color so that a particular action takes place if a first condition occurs. The user may also input a shape, symbol or character using a second color so that a particular action takes place if a second different condition occurs. By way of example without limitation, a user may input a first shape using a first color to move certain game objects to a particular location if an opponent attacks by air. The user may input a second shape using a second color to move these same game objects to some other location if the opponent attacks by land.

Figure 10B:
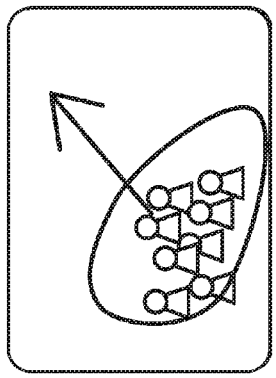
Figure 10E:
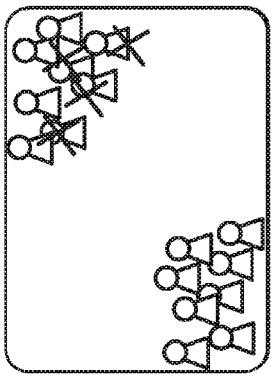
Figure 10A:
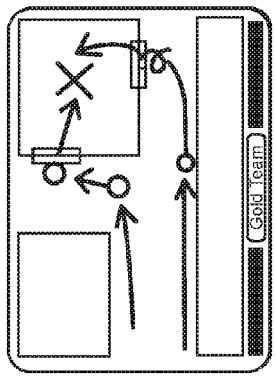
Figure 10D:
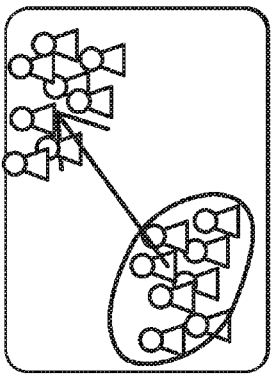

With reference to FIG. 10B, an army could be controlled by circling them and then drawing an arrow to indicate to where the army should move. With reference to FIG. 10C, a moving army may be stopped by simply drawing a line in front of them. With reference to FIG. 10D, to attack an opposing army, a user may lead his/her army into the path of his/her opponent and a melee battle will occur. Alternatively, with reference to FIG. 10E, a user's army can attack from afar (within some certain range) by simply drawing X's on various members of the opponents army to initiate an attack with projectiles. With reference to FIG. 10F, magic spells can be cast on enemies by drawing unique shapes and symbols onto them. Different shapes yield different results. For example, drawing a star as in FIG. 10F may invoke or cast a Fallen Star attack onto the enemy.

For consistency, certain drawn inputs may be recognized across a plurality or even all games. By way of example, drawing a question mark on the touch screen may invoke a help feature. By way of further example, drawing a circle around an object may select that object. By way of still further example, drawing a path with an arrow at the end will cause a selected character to move along that path.

Figure 11:
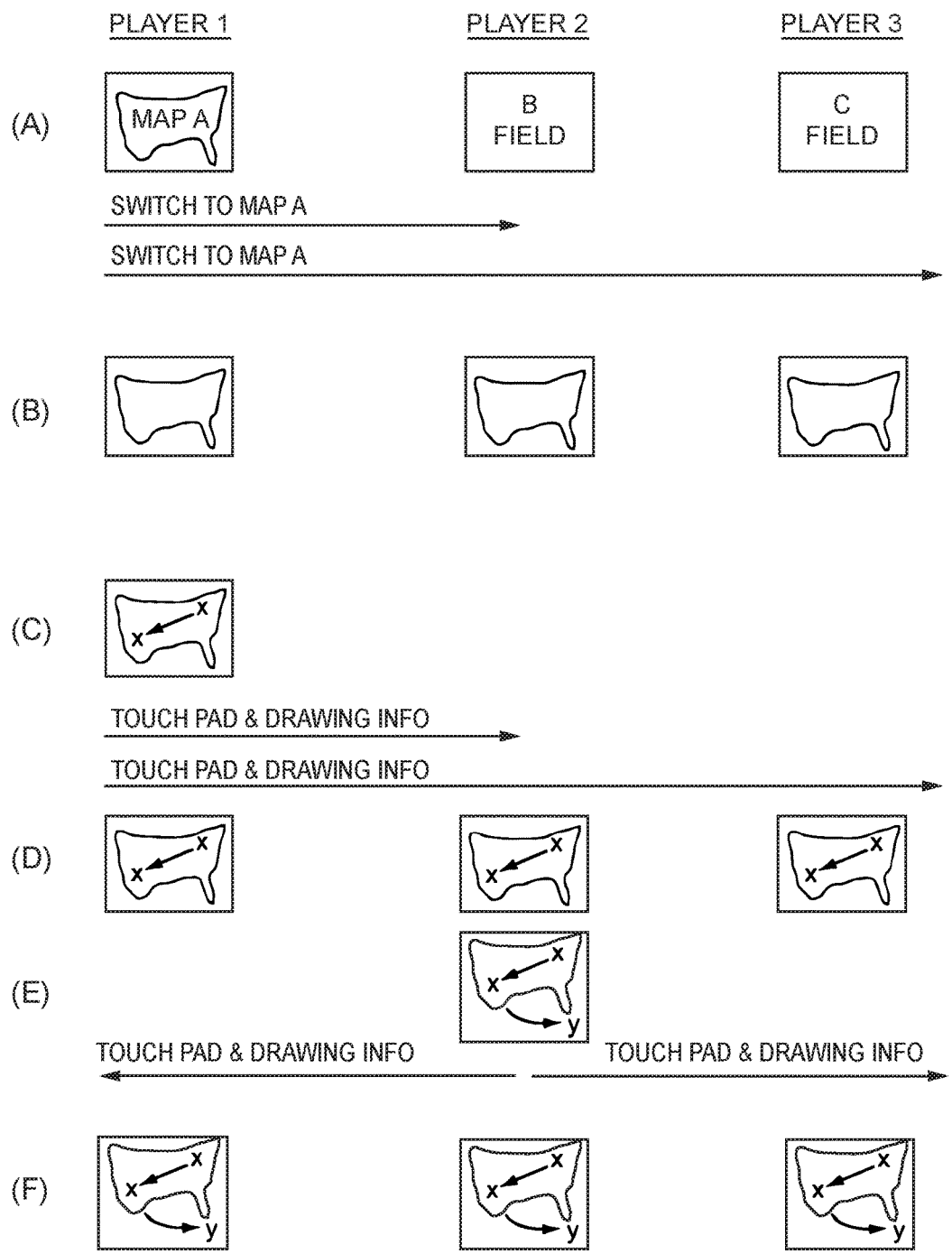
FIG. 11 is used in a more detailed explanation of touchscreen inputs for a tactical video game.

FIG. 11 will be used to provide one example of how maps can be used in a multi-user tactical game. As noted above, it is advantageous for online gamers to be able to see a map of the online world in which they are playing that displays the real-time positions of teammates and opponents. As part of a chat or communication system for online games, one user may trigger the display of this map on all other users' screens so that he/she can visually communicate tactical information about game play in this world to the other users.

For example, in a squad-based military game, User 1 may want to show his teammates, User 2 and User 3, where to position themselves in a field of play. User 1 presses a "Tactical Map" button in the game. This triggers the display of an overhead map on the screens of User 1, 2, and 3 as shown in (B) of FIG. 11. All users may then draw on this map using the touch screen 32. User 1 may, for example, show User 2 where to go by drawing an arrow from User 2's current position (displayed on the map), to a target position as shown in (C) of FIG. 11. This touchpad and drawing information is communicated to the portable game systems of Users 2 and 3 and the maps on their respective screens are updated to be same as the map on the touchscreen of User 1's portable game system as shown in (D) of FIG. 11. In an example implementation (not shown in FIG. 11), User 2 may acknowledge receipt of the instructions to move to the target position by drawing a checkmark on the map at this position. This drawing would be seen by Users 1, 2, and 3.

User 2 may then propose to further move from the target position designated by User 1 to another target position by drawing a path with an arrow on his/her touchscreen as shown in (E) of FIG. 11. Touchscreen and drawing information is transmitted from User 2's game system to the game systems of Users 1 and 3 and their touchscreens are updated to be the same as the map on the touchscreen of User 2's portable game system as shown in (F) of FIG. 11.

In other implementations, User 1 may also direct User 3 to shoot an opponent by drawing a dotted line from User 3's position (displayed on the map) to an opponent's position (also displayed on the map.) Once complete, any user may press the "Exit" button on the map, at which point, the map would disappear from all users' screens, returning them to gameplay.

The map and/or drawn tactical data may be sent in real-time from the video game system of the user drawing on the map (i.e., while the user is drawing). Users may save in the memory of the video game system maps and/or drawn tactical data generated locally or received from other users. This enables users to review drawings made in the past (i.e., playback the drawing). Drawings may be selected, for example, from a menu displayed on a display screen of the video game system. The drawings selected from memory may be further modified and communicated to other users.

In addition to storing the "drawing performances" on the user's own system (e.g., it gets stored there when they view it for the first time), it can be downloaded or streamed from a server that caches this data.

As noted above, any user can draw on a map, not just the user who initiated the map.

Generally speaking, the systems, methods, and techniques described herein may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of volatile and non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits). The computer program instructions may also be provided as data signals embodied in a carrier wave or other propagation medium via a communication link (e.g., a modem or network connection).

While the system and method have been described in connection various embodiments, it is to be understood that the system and method are not to be limited to the disclosed embodiment, but on the contrary, are intended to cover various modifications and equivalent arrangements.

We claim:

1. A video game apparatus comprising:
a touchscreen display;
memory storing program instructions; and
a computer processor configured to execute the program instructions stored in the memory to control the video game apparatus to at least:
detect an input to the touchscreen display;
detect occurrence of video game condition subsequent to the input; and
based on detecting the occurrence, determine a video game action and a timing thereof based on a shape of the input and on
a color associated with the input.

2. The video game apparatus according to claim 1, wherein the video game action comprises movement of a video game object.

3. The video game apparatus according to claim 1, wherein the video game action comprises movement of a video game character.

4. A video game apparatus comprising:
a touchscreen display;
memory storing program instructions; and
a computer processor configured to execute the program instructions stored in the memory to control the video game apparatus to at least:
display a plurality of display elements, each display element corresponding to a different member of a team;
accept movement pattern inputs to the touchscreen display for drawing movement patterns associated with the display elements corresponding to one or more members of the team;
detect occurrence of a video game event; and
based on detecting the event, determine a video game action including movement of the one or more members based on the movement patterns.

5. The video game apparatus according to claim 4, wherein the movement patterns comprise a path and a movement direction indicator.

6. The video game apparatus according to claim 4, wherein the display elements correspond to different players on a sports team.

7. The video game apparatus according to claim 6, wherein the movement pattern inputs designate movement of the one or more members relative to a field on which the sports team plays.

8. The video game apparatus according to claim 6, wherein the display elements correspond to different members of a football team, the video game event is a beginning of a play, and the movement pattern inputs are accepted prior to the beginning of the play.

9. The video game apparatus according to claim 6, wherein the display elements correspond to different members of a baseball team and the computer processor further controls the video game apparatus to accept drawing input for designating one or both of a pitch type and location.

10. The video game apparatus according to claim 4, wherein the display elements correspond to different members of a tactical team.

11. The video game apparatus according to claim 4, wherein the display elements correspond to different members of a military team.

12. The video game apparatus according to claim 4, wherein the computer processor processes the movement patterns in accordance with respective colors used to draw the movement patterns.

13. A non-transitory computer-readable medium storing program instructions which, when executed by a computer processor of a video game apparatus comprising a touchscreen display, control the video game apparatus to perform operations comprising:
displaying a plurality of display elements, each display element corresponding to a different member of a team;
accepting movement pattern inputs to the touchscreen display for drawing movement patterns associated with the display elements corresponding to one or more members of the team;
detecting occurrence of a video game event; and based on detecting the event, determining a video game action including movement of the one or more members based on the movement patterns.

14. The non-transitory computer-readable medium according to claim 13, wherein the movement patterns comprise a path and a movement direction indicator.

15. The non-transitory computer-readable medium according to claim 13, wherein the display elements correspond to different players on a sports team.

16. The non-transitory computer-readable medium according to claim 15, wherein the movement pattern inputs designate movement of the one or more members relative to a field on which the sports team plays.

17. The non-transitory computer-readable medium according to claim 15, wherein the display elements correspond to different members of a football team, the video game event is a beginning of a play, and the movement pattern inputs are accepted prior to the beginning of the play.

18. The non-transitory computer-readable medium according to claim 15, wherein the display elements correspond to different members of a baseball team and the computer processor further controls the video game apparatus to accept drawing input for designating one or both of a pitch type and location.

19. The non-transitory computer-readable medium according to claim 13, wherein the display elements correspond to different members of a tactical team.

20. The non-transitory computer-readable medium according to claim 13, wherein the display elements correspond to different members of a military team.

21. The non-transitory computer-readable medium according to claim 13, wherein the movement patterns are processed in accordance with respective colors used to draw the movement patterns.

22. A computer device comprising a processor and a non-transitory computer-readable medium according to claim 13.

* * * * *